US011336954B1

(12) United States Patent
Vilke et al.

(10) Patent No.: US 11,336,954 B1
(45) Date of Patent: May 17, 2022

(54) METHOD TO DETERMINE THE FPS ON A CLIENT WITHOUT INSTRUMENTING RENDERING LAYER

(71) Applicant: Amazon Technologies, Inc., Seattle, WA (US)

(72) Inventors: Stephen Daniel Vilke, Bainbridge Island, WA (US); David Scheiderman, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/217,653

(22) Filed: Dec. 12, 2018

(51) Int. Cl.
*H04N 5/765* (2006.01)
*H04N 21/44* (2011.01)
*G11B 27/36* (2006.01)
*H04N 21/442* (2011.01)
*H04N 21/433* (2011.01)
*H04N 9/80* (2006.01)

(52) U.S. Cl.
CPC ....... *H04N 21/44008* (2013.01); *G11B 27/36* (2013.01); *H04N 21/4334* (2013.01); *H04N 21/442* (2013.01)

(58) Field of Classification Search
USPC .................................. 386/232, 248
See application file for complete search history.

(56) References Cited

U.S. PATENT DOCUMENTS

| | | | |
|---|---|---|---|
| 7,516,255 B1 | 4/2009 | Hobbs | |
| 7,573,886 B1 | 8/2009 | Ono | |
| 8,144,255 B2 * | 3/2012 | Hirayama | H04N 7/014 348/701 |
| 9,172,740 B1 | 10/2015 | Jia et al. | |
| 9,311,692 B1 | 4/2016 | Jia et al. | |
| 9,401,128 B1 * | 7/2016 | Jepsen | G06F 3/00 |
| 9,620,041 B2 * | 4/2017 | Liu | G09G 3/3648 |
| 9,762,636 B2 | 9/2017 | Price | |
| 10,264,070 B2 | 4/2019 | Bradley et al. | |
| 10,331,394 B1 | 6/2019 | Sarfi et al. | |
| 10,346,715 B2 * | 7/2019 | Makarewicz | B60R 1/12 |
| 10,404,963 B1 * | 9/2019 | Kenrick | H04N 13/344 |
| 10,735,650 B2 * | 8/2020 | Kinoshita | H04N 5/369 |
| 2001/0036308 A1 | 11/2001 | Katayama et al. | |
| 2003/0088421 A1 | 5/2003 | Maes et al. | |
| 2003/0152034 A1 | 8/2003 | Zhang et al. | |
| 2004/0154460 A1 | 8/2004 | Virolainen et al. | |

(Continued)

OTHER PUBLICATIONS

International Search Report and Written Opinion, dated Feb. 26, 2020, International Patent Application No. PCT/US2019/066070, filed Dec. 12, 2019.

(Continued)

*Primary Examiner* — Nigar Chowdhury
(74) *Attorney, Agent, or Firm* — Davis Wright Tremaine LLP

(57) ABSTRACT

Method and system for determining frame rate of multimedia content streaming on a client device are presented herein. The method includes selecting a region within a screen of a computing display device displaying a video stream. One or more image frames of the video stream in the region are recorded. Changes in the color composition between the recorded image frames are detected. Based on the changes in the color composition, the frame rate of the video stream is determined.

20 Claims, 11 Drawing Sheets

(56) References Cited

U.S. PATENT DOCUMENTS

| | | |
|---|---|---|
| 2007/0110074 A1 | 5/2007 | Bradley et al. |
| 2008/0024599 A1* | 1/2008 | Hirakawa ............... H04N 7/183 348/65 |
| 2008/0052414 A1* | 2/2008 | Panigrahi ......... H04N 21/64769 709/246 |
| 2008/0137755 A1* | 6/2008 | Onur .................... H04N 19/115 375/240.26 |
| 2008/0198930 A1 | 8/2008 | Matsubayashi |
| 2008/0198931 A1* | 8/2008 | Chappalli ............... H04N 19/61 375/240.16 |
| 2008/0278445 A1* | 11/2008 | Sweetser ............... G06F 3/0325 345/158 |
| 2009/0100493 A1* | 4/2009 | Jones ................. H04N 21/8173 725/131 |
| 2009/0210817 A1 | 8/2009 | Schmieder et al. |
| 2009/0241110 A1 | 9/2009 | Heo et al. |
| 2009/0284442 A1* | 11/2009 | Pagan .................. H04L 65/607 345/2.1 |
| 2009/0285217 A1 | 11/2009 | Frink et al. |
| 2010/0045690 A1* | 2/2010 | Handschy ............. G09G 3/3629 345/549 |
| 2010/0046623 A1* | 2/2010 | Chen ....................... H04N 7/01 375/240.16 |
| 2010/0091042 A1* | 4/2010 | Inoue ................... G09G 3/2025 345/690 |
| 2010/0128054 A1* | 5/2010 | Manabe ................. G09G 5/003 345/589 |
| 2010/0164839 A1 | 7/2010 | Lyons et al. |
| 2010/0198575 A1 | 8/2010 | Hollis |
| 2010/0231738 A1* | 9/2010 | Border .................. H04N 5/772 348/222.1 |
| 2010/0231800 A1* | 9/2010 | White .................. G09G 3/2022 348/663 |
| 2010/0254603 A1 | 10/2010 | Rivera |
| 2010/0256344 A1* | 10/2010 | Thompson ............. B82Y 15/00 534/558 |
| 2011/0032419 A1* | 2/2011 | Sakaniwa .............. H04N 7/014 348/452 |
| 2011/0043806 A1* | 2/2011 | Guetta .................... G01S 17/04 356/432 |
| 2011/0141372 A1* | 6/2011 | Kato .................... H04N 19/587 348/700 |
| 2011/0209064 A1 | 8/2011 | Jorgensen et al. |
| 2011/0228984 A1* | 9/2011 | Papke ................. G06K 9/00771 382/103 |
| 2011/0231419 A1* | 9/2011 | Papke .................... G06F 16/784 707/756 |
| 2012/0226742 A1 | 9/2012 | Momchilov et al. |
| 2012/0257671 A1* | 10/2012 | Brockmann ..... H04N 21/64753 375/240.02 |
| 2012/0314599 A1* | 12/2012 | Vilke ...................... H04L 43/04 370/252 |
| 2012/0324365 A1 | 12/2012 | Momchilov et al. |
| 2013/0033618 A1* | 2/2013 | Kato ........................ G06T 7/75 348/234 |
| 2013/0044885 A1 | 2/2013 | Master et al. |
| 2013/0055102 A1 | 2/2013 | Matthews et al. |
| 2013/0064289 A1* | 3/2013 | Chernyshev ......... H04N 19/436 375/240.03 |
| 2013/0163428 A1 | 6/2013 | Lee et al. |
| 2013/0185633 A1 | 7/2013 | Bunker et al. |
| 2013/0215290 A1* | 8/2013 | Solhusvik .......... H04N 5/35572 348/231.99 |
| 2013/0219012 A1 | 8/2013 | Suresh et al. |
| 2014/0043349 A1* | 2/2014 | Parmar ................ G09G 3/3473 345/547 |
| 2014/0188977 A1 | 7/2014 | Song et al. |
| 2014/0244863 A1 | 8/2014 | Bradley et al. |
| 2014/0282753 A1* | 9/2014 | Li .................... H04N 21/44008 725/81 |
| 2014/0359494 A1 | 12/2014 | Clark |
| 2015/0117545 A1* | 4/2015 | Fu ......................... H04N 19/30 375/240.18 |
| 2015/0125032 A1* | 5/2015 | Yamanaka ......... G06K 9/00624 382/103 |
| 2015/0215753 A1 | 7/2015 | Leipzig et al. |
| 2015/0244812 A1 | 8/2015 | Brunson et al. |
| 2015/0244940 A1* | 8/2015 | Lombardi ............. G06F 1/1641 348/333.06 |
| 2015/0254726 A1 | 9/2015 | Cassidy et al. |
| 2015/0350555 A1* | 12/2015 | Nishi .................... H04N 5/341 348/333.02 |
| 2016/0127432 A1 | 5/2016 | Privat |
| 2016/0133224 A1* | 5/2016 | Nakajima ............... G09G 5/005 348/445 |
| 2016/0189393 A1* | 6/2016 | Rao ..................... G06K 9/00798 701/41 |
| 2016/0218986 A1* | 7/2016 | Klemetti ................. H04L 47/30 |
| 2016/0219218 A1* | 7/2016 | Kinoshita ................ H04N 5/30 |
| 2016/0246560 A1 | 8/2016 | Petrov |
| 2017/0034542 A1* | 2/2017 | Yabu ....................... G06Q 30/00 |
| 2017/0054793 A1 | 2/2017 | Urbach |
| 2017/0104909 A1* | 4/2017 | Nakajima ............ H04N 5/2351 |
| 2017/0141906 A1 | 5/2017 | Rainish |
| 2017/0150045 A1* | 5/2017 | Goswami ............... H04N 5/265 |
| 2017/0256281 A1 | 9/2017 | Hoarty |
| 2017/0279757 A1* | 9/2017 | Kereth .................... H04L 51/10 |
| 2017/0365237 A1 | 12/2017 | Koneru et al. |
| 2018/0027167 A1* | 1/2018 | He ...................... H04N 13/243 348/211.1 |
| 2018/0054481 A1 | 2/2018 | Bradley et al. |
| 2018/0158424 A1* | 6/2018 | Okamoto ............... G09G 5/005 |
| 2018/0242920 A1* | 8/2018 | Hresko ................... G06F 3/011 |
| 2018/0332132 A1 | 11/2018 | Sampath et al. |
| 2019/0005351 A1* | 1/2019 | Zhou ...................... G06T 7/254 |
| 2019/0012531 A1* | 1/2019 | Radwin ................... G06T 7/246 |
| 2019/0029543 A1* | 1/2019 | Hutchinson .......... A61B 5/7485 |
| 2019/0054377 A1* | 2/2019 | Nelson ................ G07F 17/3246 |
| 2019/0141351 A1 | 5/2019 | Alakuijala et al. |
| 2019/0156785 A1* | 5/2019 | Marchya .................. G09G 5/10 |
| 2019/0281206 A1* | 9/2019 | Lee ..................... H04N 5/23212 |
| 2019/0302881 A1* | 10/2019 | Chan ....................... G06F 3/011 |
| 2020/0059643 A1* | 2/2020 | Marchya ............... H04N 19/423 |
| 2020/0257807 A1* | 8/2020 | Chen ..................... H04N 1/3216 |

OTHER PUBLICATIONS

International Search Report and Written Opinion, dated Feb. 26, 2020, International Patent Application No. PCT/US2019/066072, filed Dec. 12, 2019.

Wikipedia, "IEEE 802.11," page last modified Feb. 7, 2017, retrieved Feb. 13, 2017, from https://en.wikipedia.org/wiki/IEEE_802.11, 9 pages.

Wikipedia, "IEEE 802.16," page last modified Nov. 21, 2016, retrieved Feb. 13, 2017, from https://en.wikipedia.org/wiki/IEEE_802.16, 8 pages.

Wikipedia, "IEEE 802.21," page last modified Aug. 4, 2016, retrieved Feb. 13, 2017, from https://en.wikipedia.org/wiki/IEEE_802.21, 3 pages.

IEEE 100, "The Authoritative Dictionary of IEEE Standards Terms," Seventh Edition, IEEE Standards Information Network, IEEE Press, Dec. 2000, 3 pages (pertinent p. 452).

* cited by examiner

METHOD TO DETERMINE THE FPS ON A CLIENT WITHOUT INSTRUMENTING RENDERING LAYER

BACKGROUND

Remote transmission of multimedia over computer networks has become more prevalent as improvements in computer networks allowed high-definition and high frame rate video content to be streamed to users. In many cases, remote transmission of multimedia provides an alternative to previously existing systems in which multimedia files need to be downloaded then stored at persistent storage of a client device before the content of such files is displayed. Other video-based services, such as videoconferencing or remote control session service, have also allowed different users to communicate with each other through video streams. However, it can be difficult to evaluate the quality of video playback as experienced by the user of a client device. One example indicator of video content quality is the frame rates of video as they are displayed on client devices.

Typically, frame rates are calculated at the systems of content service providers that transmit the multimedia files to the client devices. Such approaches, however, may be inaccurate because there may be other factors that can affect the frame rates of the multimedia files actually being displayed on the client devices. For example, network conditions including peak hour usage may affect the network bandwidth utilized to stream a video through a communication network. In another conventional approach, frame rates of videos are determined by specialized hardware that analyze frame rates at the processor level (e.g., graphics processing unit), but the processor-level analysis requires knowledge of the source file, as well adding another instrumental layer on the device performing the frame rate analysis. In some scenarios, however, client device may not have the computing resources or the capacity to implement the specialized hardware. Accordingly, there exists a challenge to determine the accurate frame rates of videos being displayed on client devices.

BRIEF DESCRIPTION OF THE DRAWINGS

Various techniques will be described with reference to the drawings, in which.

DETAILED DESCRIPTION

This disclosure relates to determining frame rates of content streaming on a client device with enhanced accuracy. The aspects of the present disclosure may include selecting a region within a screen of a device displaying content and recording each frame in the region to determine the frame rate between the recorded frames. In some aspects of the present disclosure, color composition of the frames can be compared to determine the changes occurring in the frames, and such changes can be applied to a function to determine the frame rate of the content being displayed at the client device.

Aspects of the present disclosure may include recording the frames within the region at a high rate to enhance the accuracy of the frame rate determination. In additional aspects, the size and the location of the region may be dependent of the capacity of the device performing the frame rate analysis or displaying the content stream. Based on the high rate of capture, the aspects of the present disclosure can calculate the number of changes each second and provide the number of changes as frames per second change. The aspects of the present disclosure may be implemented as another application that can be executed in parallel the video streaming application, yet establish evaluation of frame rates within performance capacity of the device.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including improving the determination of accurate frame rates of videos being displayed on client devices. By capturing the color composition for each frame of a video stream displayed on the user interface device, then determining the frame rate based on the color composition, video processing and content streaming systems may improve by utilizing much more accurate and realistic frame rate values. In addition, without relying on frame rate data provided by the streaming service providers and basing on the actual frame rate displayed on a user interface device, the aspects of the present disclosure enable normalizing the frame rates on a device level at which streaming quality of service providers can be compared to enhance user experience.

Figure 1:
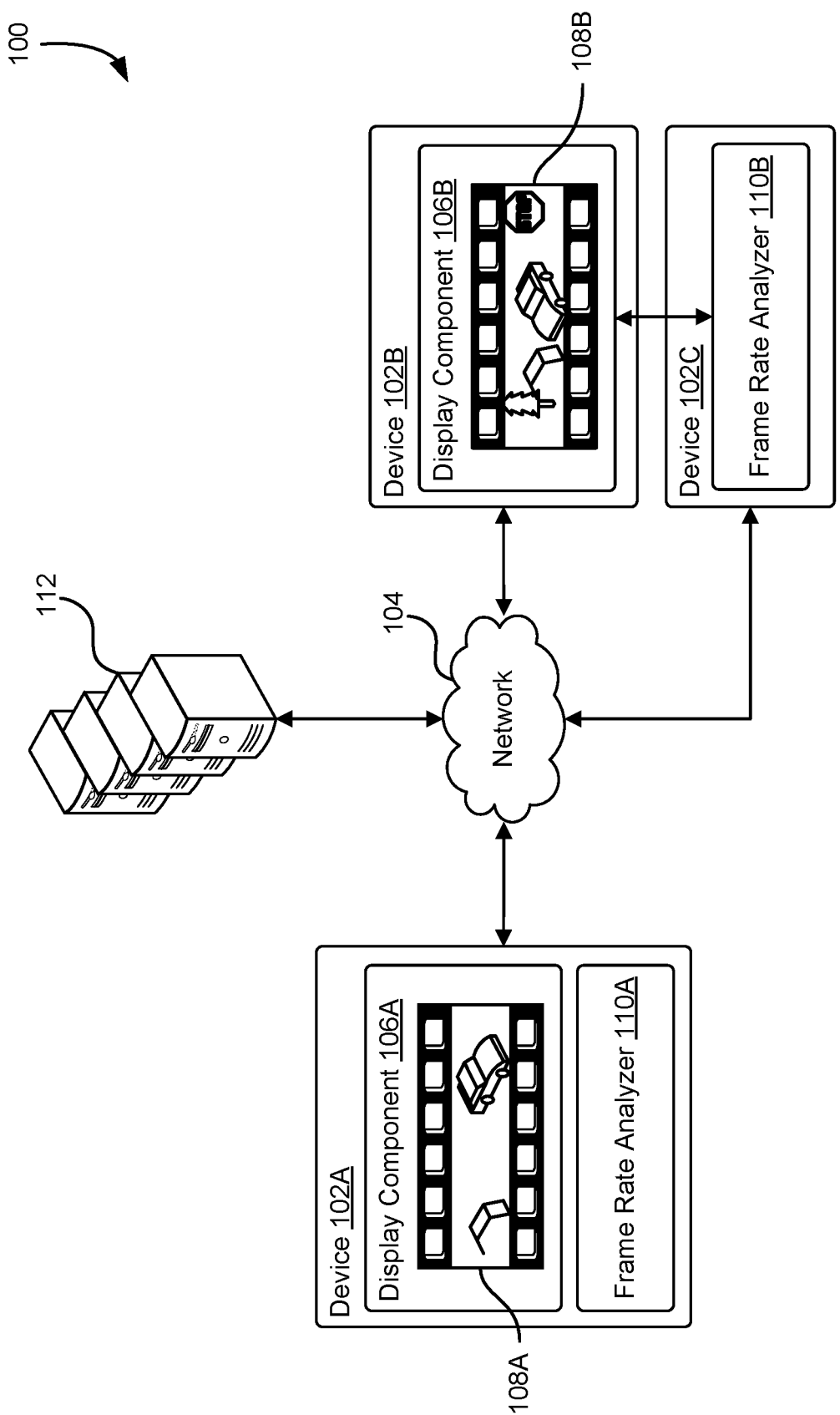
FIG. 1 shows an illustrative example of an environment in which frame rate analysis is performed on video streams displayed on different device configurations in accordance with an embodiment.

FIG. 1 shows an illustrative example of an environment 100 in which frame rate analysis is performed on video streams displayed on different device configurations in accordance with an embodiment. In several embodiments, environment 100 includes devices 102A-C, which may be any type of consumer electronics device including a laptop or desktop computer, a tablet, a mobile phone or a smartphone, a smart television, a set-top box or a stream player or a network-enabled digital optical disk player, such as a Blu-Ray™ player or digital versatile disc (DVD™) player, among others. Devices 102A-C may be configured to communicate over network 104 using any type of communication protocol including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others. The devices 102A-C may be equipped with one or more processors, such as a central processing unit (CPU) or a graphics processing unit (GPU) that provides computing functionality to a user. Examples of a CPU include those utilizing a complex instruction set computing (CISC) architecture, such as the x86 CPU, and others that utilize a reduced instruction set computing (RISC) architecture, such as the advanced RISC machine (ARM) CPU. The user device may also be equipped with one or more input devices, such as a touchscreen that responds to a fingertip or a stylus input, a physical keyboard, a digital camera, a microphone, a touchpad or a mouse, among others. In addition, devices 102A-C may also be equipped with one or more output devices such as a screen or speakers. The devices 102A-C may further be equipped with a global positioning system (GPS) circuitry that enables locating the user device.

The devices 102A-C may be equipped with memory, such as dynamic or static memory, whereupon one or more executable instructions may be stored that cause the execution of the frame rate analyzers 110A-B and other applications. For instance, devices 102A-C may include web browsing applications that may be used to enable the devices 102A-C to display the webpage, through display components 106A-B, that is written or scripted using hypertext markup language (HTML), extensible markup language (XML), JavaScript and the like.

In one embodiment, devices 102A-C may be associated with a display subsystem such as display components 106A-106B respectively. The display components 106A-106B may be a cathode ray tube (CRT), a flat-panel device, such as a liquid crystal display (LCD), light emitting diode (LED) display, or a projection or other display device. In other embodiments, the display components 106A-106B may incorporate various types of display technologies such as low-power electronic-ink (e-ink), organic light emitting diodes (OLED), active-matrix organic light-emitting diode (AMOLED), flexible displays, and other such technologies. The display components 106A-106B may further be a touch-screen display that a customer may interact with using a finger, stylus, or other input device.

In some embodiments, the device may include both the display component 106A and frame rate analyzer 110A in which the video processing and frame rate analysis may occur internally of the device 102A. In other embodiments, separate devices can be used to implement the display and the frame rate analysis, including device 102B that includes display component 106B and device 102C that includes frame rate analyzer 110B. In some embodiments, the devices 102B and 102C may communicate through physical connections via USB, FireWire, or serial connection. In some embodiments, the devices 102B and 102C may communicate through wired network connection such as an Ethernet connection, a 10BaseT connection, or optical fiber connection. In other embodiments, the devices 102B and 102C may communicate through wireless connections including connections available via network 104 or short-range, low-power, and high-frequency radio transmissions such as Bluetooth® or near field communication (NFC).

Display components 106A-B may display video streams including frames 108A and 108B. In several embodiments, a video stream is a sequence of images ("frames") that are following one after another with determined speed and order. Each frame of the video stream (or alternatively referred to as "stream" or "video") may include an array of pixels comprising a set of image data which may include color values, which can be used by frame rate analyzer 110A to determine the frame rate of the video stream. The video stream may also include multimedia that is constantly received by and presented to an end-user while being delivered by a provider, such as a content service provider (system/server 112). In some embodiments, the video stream may be delivered by a computer resource provider (system/server 112) by means of downloading, a process in which the end-user obtains the entire file for the video stream before watching or listening to it.

In several embodiments, frame rate is a measurement of how quickly an imaging device, such as display component 108A, can produce unique consecutive frames of a stream, most often expressed in frames per second (often abbreviated "fps") or, equivalently, Hertz (Hz). For example, frame rate indicates the number of frames or images that are projected or displayed per second. Frame rates are used in synchronizing audio and pictures, whether film, television, or video. In several embodiments, each frame is associated a frame rate defined as a certain number of frames displayed in each second. Exemplary frame rates include ten, twenty, thirty, etc., frames per second. In several embodiments, higher frame rate indicates the better image quality that is displayed by the video stream.

In several embodiments, frame rate analyzers 110A-B may be one or more components that are configured to determine the frame rates of the video stream displayed on display components 106A-B. In one embodiment, frame rate analyzers 110A-B calculate frame rates of a video stream by capturing a region of each of frames 108A-B as the video stream is presented on display components 106A-B. For the region of each frame, frame rate analyzers 110A-B may obtain the color composition of the pixels, and the frame rate analyzer compares the color composition between frames. If the differences between the color compositions of pixel elements are substantial, the frame rate analyzer may update one or more values (e.g., counter values) or log that can be used as input to determine the frame rate. The frame rate analyzer may then determine the frame rate based on the above information.

Frames 108A-B include a plurality of pixels (also alternatively referred to as "picture elements" or "pixel elements") that display image data associated with video streams. In several embodiments, a pixel is the smallest unit of a digital image or graphic that can be displayed and represented on a digital display device. Pixels may be combined to form a complete image, video, text or any visible thing on a computer display. In several embodiments, a pixel is represented by a dot or square on a computer monitor display screen. Pixels are the basic building blocks of a digital image or display and are created using geometric coordinates. Depending on the graphics card and display monitor, the quantity, size and color combination of pixels varies and is measured in terms of the display resolution. For example, a display component (such as display component 106A) with a display resolution of 1280×768 will produce a maximum of 98,3040 pixels on a display screen. Each pixel has a unique logical address, a size of eight bits or more, and, in most high-end display devices, the ability to project millions of different colors. The pixel resolution spread may also determine the quality of display; more pixels per inch of monitor screen yields better image results.

Each pixel associated with frames 108A-B may include one or more color values. For example, in an RGB (red/green/blue) based color model, each pixel may be stored with a red, green, and blue value (e.g., {128, 72, 28}) corresponding the red, green, and blue light in the light spectrum. In some embodiments, the color values may be one or more values formatted in accordance with color space defined by the International Commission on Illumination (CIE), such as a L*a*b*, XYZ, RGB, or other color space.

In several embodiments, system/server 112 may include hardware components such as servers and software components such as virtual computer systems (such as web server 1106 of FIG. 11 and/or application server 1108 of FIG. 11), and may obtain and serve content in response to user requests submitted over network 104. System/server 112 may be associated with a content service provider that may manage content, access, policies, users, and/or other such computing resources for a computer system resource such as a content streaming service, directory service, a web service, and/or some other such computer system resource. The computer system resources that are managed by the computing resource service may be referred to herein as resources, computer system resources, content, assets, and/or other such terms.

In alternative some embodiments, the system/server 112 may be implemented in a distributed system that implements a platform for providing computing resources that are configurable and scalable to meet various types of computing needs, including requests for multiple video streams to be transmitted to a plurality of user devices. A content service provider associated with the system/server 112 may be configured to share relatively large amounts of content such as video content and can be distributed among a large number of users, and may include multiple computing components with configurable resources. In some embodiments, a distributed file system utilized by the content service provider in providing services may also dynamically reallocate resources on demand. Distributed tasks benefit greatly from the scalability of the content service provider because they can quickly be scaled up or down to use resources based on the customer's needs.

Figure 11:
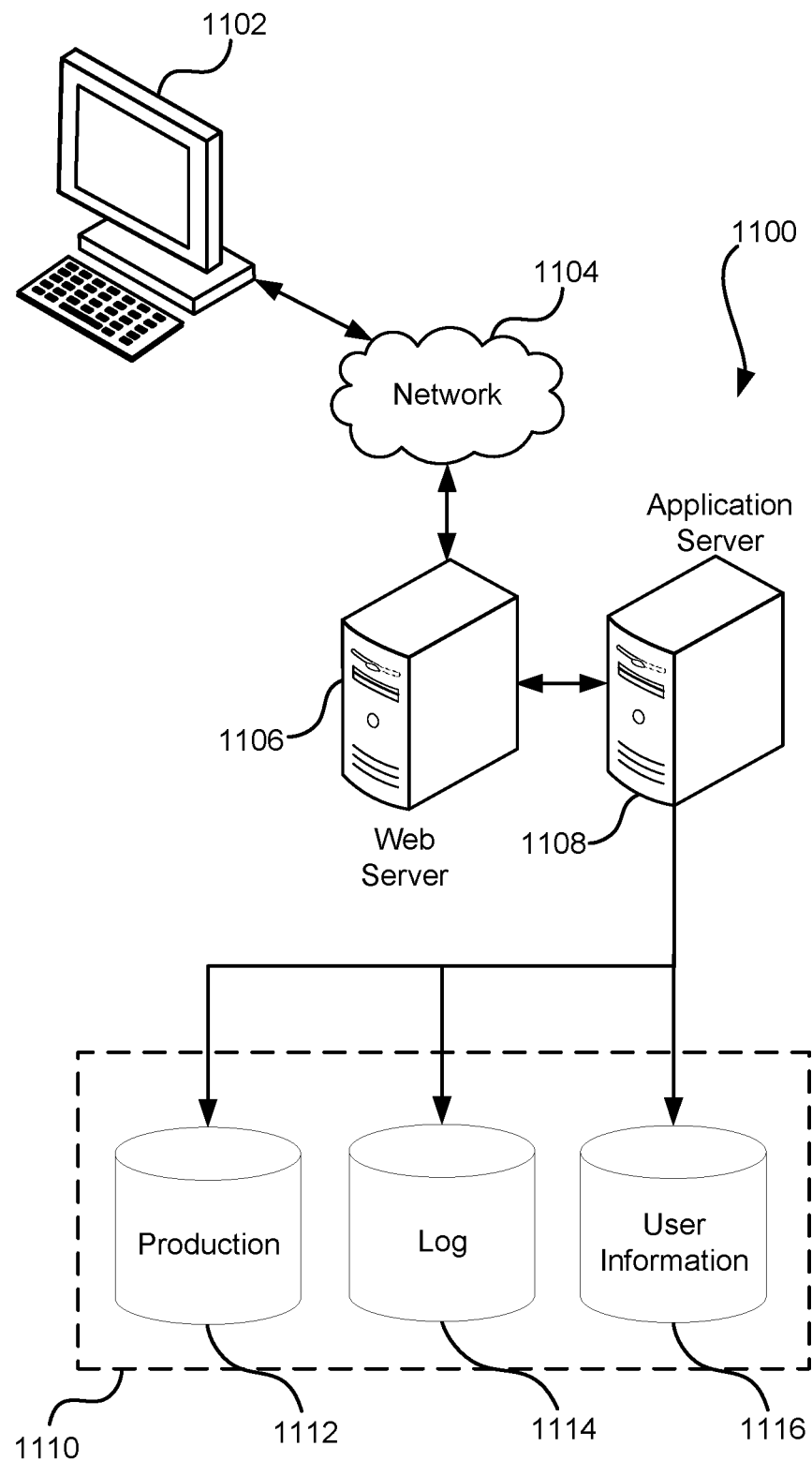
FIG. 11 illustrates a system in which various embodiments can be implemented.

In several embodiments, network 104, such as network 1104 of FIG. 11, is the medium used to provide communications links between various devices, such as devices 102A-102C and computers connected together within the environment 100. Network 104 may include connections, such as wire, wireless communication links, or fiber optic cables. In other embodiments, network 104 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, environment 100 also may be implemented as a number of different types of networks, such as for example, an intranet, a local area network (LAN), or a wide area network (WAN). FIG. 1 is intended as an example, and not as an architectural limitation for the different illustrative embodiments.

In some embodiments, system/server 112 may transmit video streams to display components 106A-B using User Datagram Protocol ("UDP"). UDP may incorporate a simple connectionless communication model with a minimum of protocol mechanism. UDP provides checksums for data integrity, and port numbers for addressing different functions at the source and destination of the datagram. UDP has no handshaking dialogues, and includes no guarantee of delivery, ordering, or duplicate protection. In some embodiments, UDP is used for video streaming because dropping packets is preferable to waiting for packets delayed due to retransmission, which may not be an option in a real-time video streaming systems. In other embodiments, the system/server 112 may transmit the video streams using other types of protocols including Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk.

Figure 2:
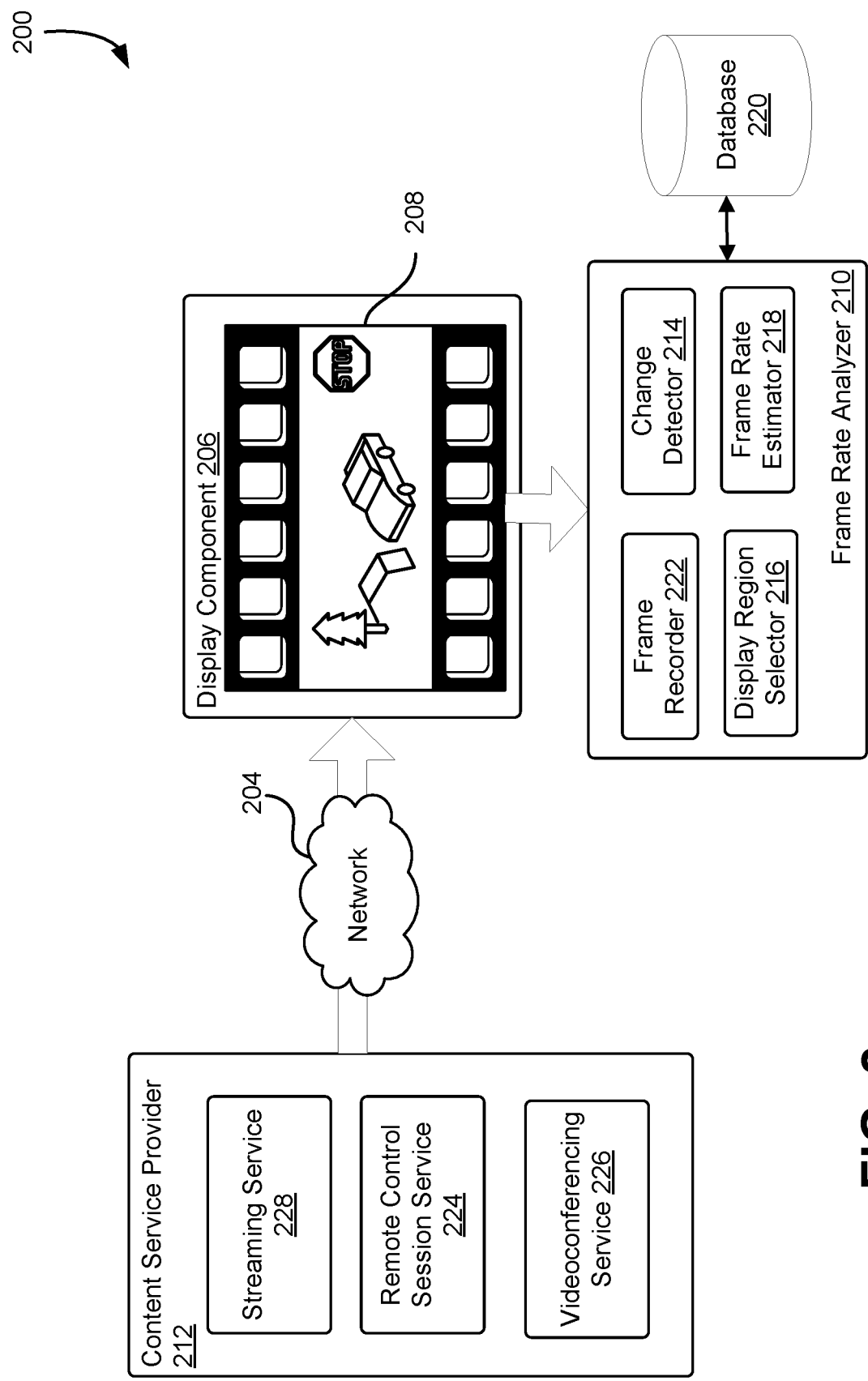
FIG. 2 shows an illustrative example of an environment in which frame rate is determined for a video stream transmitted by a content service provider in accordance with an embodiment.

FIG. 2 shows an illustrative example of an environment 200 in which frame rate is determined for a video stream transmitted by a content service provider in accordance with an embodiment. Network 204 may be network 104 of FIG. 1 in accordance with an embodiment. Display component 206 may be one of display components 106A-B of FIG. 1 in accordance with an embodiment. Frame rate analyzer 210 may be one of frame rate analyzers 110A-B of FIG. 1 in accordance with an embodiment. Frame 208 may be one of frames 108A-B of FIG. 1 in accordance with an embodiment.

The content service provider 212 may provide various services such as streaming service 228, remote control session service 224, and video conferencing service 226, in which content generated by these services can be provided to the display component 206. Once the content (e.g., video stream) is displayed on the display component 206, the frame rate analyzer 210 may determine the frame rate associated with the content at the display component level. In one embodiment, the streaming service 228 may include one or more content servers that provide access to a library of media titles that can be viewed on a range of different devices. The library of media titles includes without limitation, the media title associated with the video stream of frame 208. Each device (e.g., devices 102A-B of FIG. 1) may connect to the streaming service 228 under different connection conditions. Some notable connection conditions include, without limitation, bandwidth and latency. In addition, each different device may include different hardware for outputting the media title to end user(s). For example, a given endpoint device could include a display screen having a particular screen size and a particular screen resolution. Based on the connection and device conditions of the devices, the actual frame rate of video stream displayed on display component 206 may differ from the theoretical frame rate determined by the streaming service 228.

In several embodiments, the device that connects to the streaming service 228 executes a local or web application that determines, for a given media title, an appropriate encoded version of the video to stream to the device based on the connection conditions and the properties of the device. More specifically, the application attempts to select a particular encoded version of the media title that provides the best visual quality during playback of the media title on the endpoint device while avoiding playback interruptions due to buffering or rebuffering.

The content service provider 212 may additionally include a remote control session service 224 (also referred to as "desktop sharing service") that allows one or more devices to establish connections to a server-side application (e.g., system/server 112 of FIG. 1, application server 1108 of FIG. 11) using a remote session communication protocol, such as Remote Desktop Protocol (RDP), X-Windows protocol, Virtual Network Computing (VNC) protocol, Remote Frame Buffer protocol, etc. For example, RDP specifies a number of processing mechanisms for encoding client input (e.g., mouse movement, keyboard input, etc.) into protocol data units for provision to a remote computing device, such as system/server 112, and corresponding mechanisms for sending bitmap updates and low level interface information back to the device.

In some embodiments, the remote control session service 224 may configure one or more applications of devices to receive screenshots or image representations of rendered content from a server. The device may present the screen shot while receiving the content item in a parallel or background process for rendering locally on the client device. When the content item has been rendered and is ready for presentation to the user, the screenshot displayed by the application may be replaced by the locally rendered content. The processing of content by a remote control session service 224 in the routines described in detail below is not limited to the illustrative remote rendering methods described above. Rather, a remote control session service 224 may implement any pre-rendering or other pre-processing of content that reduces user-perceived latency and improves the user experience.

The content service provider 212 may additionally include video conferencing service 226 that allow for devices to be connected to each other for communication purposes. In several embodiments, the content service provider 212 may allow a device (e.g., device 102A of FIG. 1) to start a video conferencing session with another device (e.g., device 102B of FIG. 1). In some embodiments, video conferencing service 226 allows two or more people to communicate by simultaneous two-way video and audio transmissions. The video transmissions include communicating a video stream. Because the video and audio transmission needs to be kept at highest quality possible, the video conferencing service 226 needs to determine an accurate frame rate for each communicating device to adjust the network bandwidth, increase computing resources to process the video stream, etc.

To determine the quality of the content provided by the content service provider 212, the frame rate analyzer 210 may access the one or more frames 208 of the video stream displayed by the display component 206, then estimates the frame rate associated with the content. In several embodiments, the frame rate analyzer 210 includes one or more hardware or software components such as the frame recorder 222, change detector 214, display region selector 216, and frame rate estimator 218. In one embodiment, the display region selector 216 determines a region in the frame 208 at which the region can be processed to determine the frame rate associated with the video stream.

In several embodiments, the display region selector 216 selects the region to conserve computing resources associated with analyzing the video stream, because recording thousands of frames per minute may not be feasible with devices having limited performance capacity, such as internet of things (IoT) devices with display components. In some embodiments, the display region selector 216 may select a region encompassing the entire screen of the display component 206 that displays the frame 208, as the device may include sufficient computing resources to process the image data captured and analyzed by the frame rate analyzer 210. In some embodiments, the display region selector 216 may increase or decrease the size of the region in response to determining that the previous size of the region may not capture enough image data to increase accuracy of the frame rate of the video stream. In additional embodiments, the display region selector 216 may change the location of the region, also to increase accuracy of the frame rate of the video stream. In some embodiments, however, the display region selector 206 is omitted. The region may, for example, be fixed to a particular portion of each frame, or the entire frame may be used.

The frame rate analyzer 210 may also include frame recorder 222, which is configured to capture one or more frames (e.g., frame 208) of the region that displays the video stream. In one embodiment, the frame recorder 222 may also record a timestamp at which the frame was recorded. In one embodiment, the frame recorder 222 performs a screenshot process of the region with the highest rate that can be performed by the device implementing the frame rate analyzer 210. In some embodiments, a minimum threshold value can be determined at which the frame recorder 222 may communicate with the display region selector 216 to adjust the size of the region if the number of recorded frames fall below the minimum threshold value. In such embodiments, a low number of recorded frames may indicate that the device is operating beyond its capacity and/or allotted computing resources. Once the regions corresponding to the frames are recorded, the frame recorder 222 may provide such recorded image data to the change detector 214.

In several embodiments, the frame rate analyzer 210 includes a change detector 214 which obtains data from the recorded regions corresponding to the frames associated with the video stream and determines, based on the data, whether a characteristic of the data has changed. For example, the change detector 214, in some embodiments, determines whether color composition of the regions between frames have changed. In some embodiments, the color composition of the region may be determined by obtaining one or more pixels across the recorded region and determining the color values stored by these pixels in the recorded region. As illustrated in FIG. 1, the color values may include values derived in accordance with the RGB (red/green/blue) based color model, in which each pixel may be stored with a red, green, and blue values (e.g., {128, 72, 28}) corresponding the red, green, and blue light in the light spectrum. After the color values are obtained, the change detector 214 determines whether sufficient amount of the color composition between the regions corresponding to the frames have been altered. If so, the change detector 214 may update a counter value that can be used by the frame rate estimator 218 to determine the frame rate of the video stream.

In other embodiments, the characteristics used by the change detector can include one or more of luminance, contrast, image gradients, and so forth. It will be appreciated that these examples are intended to be illustrative, and should not be construed so as to limit the scope of the present disclosure to only those embodiments which include the specific examples provided. In some embodiments, the characteristic is determined based in part on the processing capacities of the client device on which the image is being played, as some approaches to detecting change may be more suited to devices with certain processing capacities. Likewise, certain approaches to detecting change might be better suited to large or small sample regions, which may in turn be determined based on the processing capacities of the client device. For example, in an embodiment, the frame rate analyzer 210 selects a change detection mechanism based at least in part on processor capacity of a client device, such as a display component 206 of a client device.

In several embodiments, the frame rate estimator 218 obtains the values generated by the change detector 214 and determines the frame rate of the video stream. In one embodiment, the frame rate estimator 218 may obtain the counter value derived from differences of color values corresponding to each recorded frame of the video stream and apply the counter value to one or more functions that determines the frames per second. Other parameters used to determine the frame rate may include the timestamps values recorded by the frame recorder 222, number of frames per second as recorded by the frame recorder 222, etc.

In additional embodiments, frame rate analyzer 210 may interact with database 220 (e.g., data store 1110 of FIG. 11) to store and retrieve color values that can be used to determine frame rates of the video stream. In some embodiments, each determined frame rate can be logged in to the database 220 to continue tracking the frame rate across the entire video stream. The logged frame rates may also be provided to other systems and services, including content service provider 212, so that the frame rate data can be used to evaluate performance of the video processing performed by the content service providers.

Figure 3:
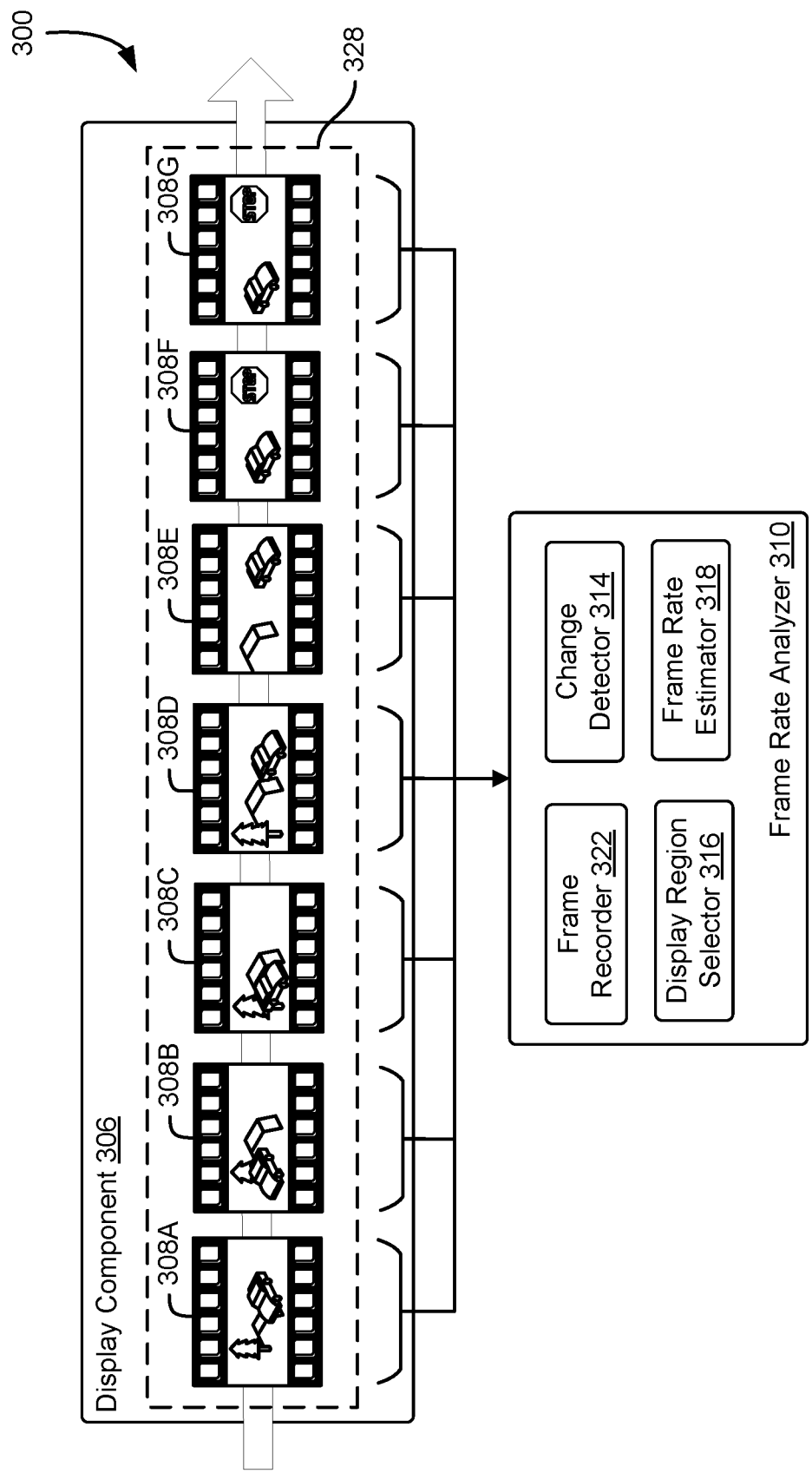
FIG. 3 shows an illustrative example of a video streaming event in which the frame rate is determined based on frames of a video stream in accordance with an embodiment.

FIG. 3 shows an illustrative example of a video streaming event 300 in which the frame rate is determined based on frames of a video stream in accordance with an embodiment. Frame rate analyzer 310 may be frame rate analyzer 210 of FIG. 2 in accordance with an embodiment. Frame recorder 322 may be frame recorder 222 of FIG. 2 in accordance with an embodiment. Change detector 314 may be change detector 214 of FIG. 2 in accordance with an embodiment. Display region selector 316 may be display region selector 216 of FIG. 2 in accordance with an embodiment. Frame rate estimator 318 may be frame rate estimator 218 of FIG. 2 in accordance with an embodiment. Display component 306 may be display component 206 of FIG. 2 in accordance with an embodiment. One of frames 308A-G may be one of frame 208 of FIG. 2 in accordance with an embodiment.

In several embodiments, the display component 306 displays a video stream 328 which may be stored locally on a client device (e.g., device 102A of FIG. 1) or transmitted by a system of a content service provider (e.g., system/server 112 of FIG. 1). The video stream 328 includes one or more frames, including frames 308A-G. As illustrated in FIG. 3, each frame of frames 308A-G depicts various images. Based on the differences between the images depicted through frames 308A-G, the frame rate analyzer determines the frame rate for the video stream 328. For example, the frame rate analyzer 310 may determine the changes to the color values between frames 308A and 308B then, based on the changes, may estimate the frame rate of the video stream 328. In several embodiments, the frame rate analyzer 310 may continue the process of comparing the color values between the successive frames (e.g., 308B with 308C, 308C with 308D, 308D with 308E), so as to continue updating the frame rates (e.g., fps) as the video stream is displayed on the display component 306.

In some instances, the changes between frames (e.g., 308B and 308C) may be minimal, which may indicate that the frame rate should be updated to specify a lower frame rate. In such instances, the minimal changes to the frames can be reflected as a value that will not exceed a predetermined value, which will cause the counter value to be maintained. In one embodiment, the stagnant counter value may be applied to a function with a larger delta of time values, which will cause the frame rate to decrease.

Figure 4:
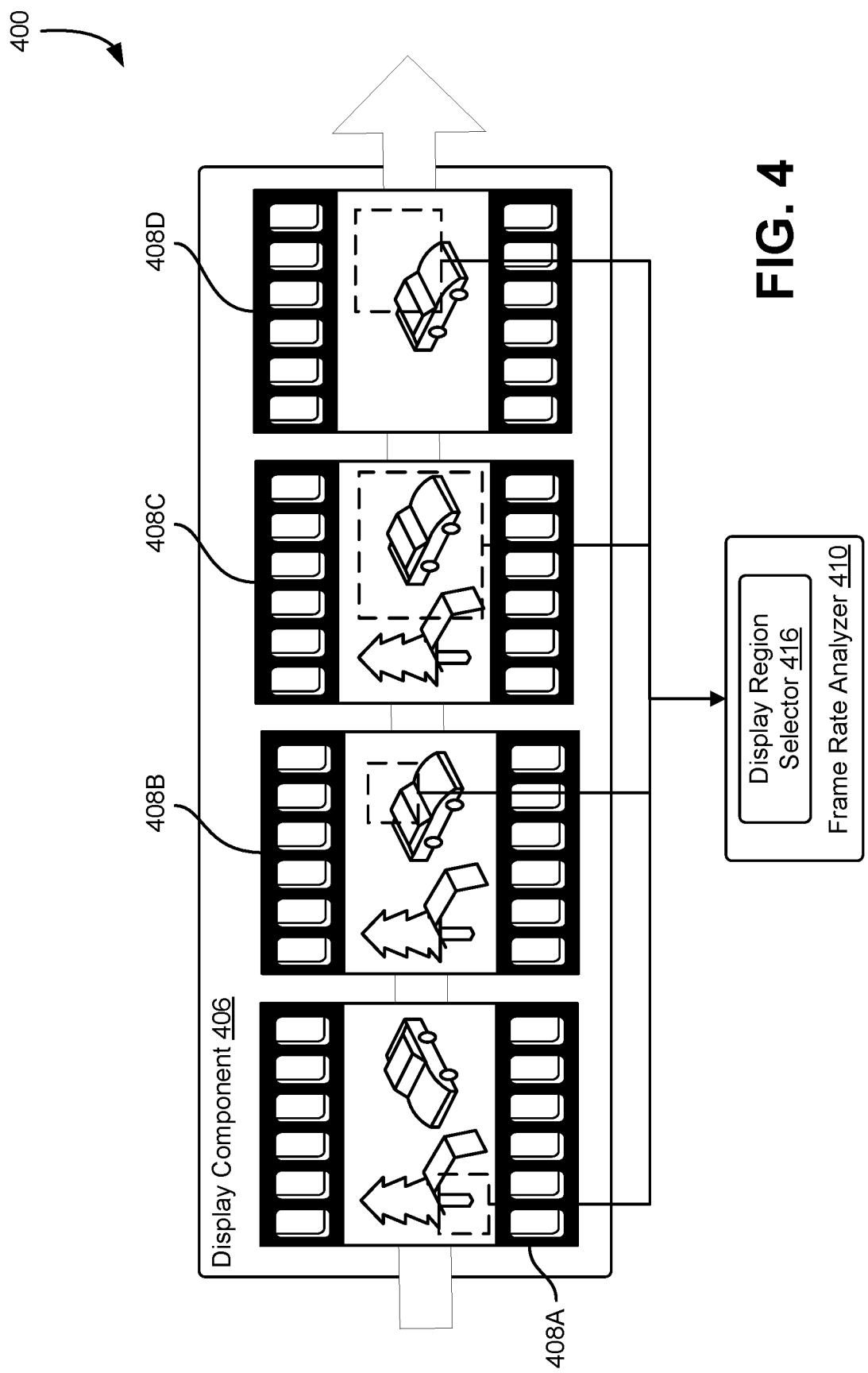
FIG. 4 shows an illustrative example of a video streaming event in which the frame rate is determined based on different regions in each frame of a video stream in accordance with an embodiment.

FIG. 4 shows an illustrative example of a video streaming event 400 in which the frame rate is determined based on different regions in each frame of a video stream in accordance with an embodiment. Frame rate analyzer 410 may be frame rate analyzer 210 of FIG. 2 in accordance with an embodiment. Display region selector 416 may be display region selector 216 of FIG. 2 in accordance with an embodiment. Display component 406 may be display component 206 of FIG. 2 in accordance with an embodiment. One of frames 408A-D may be one of frame 208 of FIG. 2 in accordance with an embodiment.

In one embodiment, the display region selector 416 of the frame rate analyzer 410 selects a region within frame 408A that is displaying an image of the video stream. The frame rate analyzer 410 may begin frame rate analysis on the region selected by the display region selector 416. In several embodiments, the regions can be recorded by performing one or more screen shots of the frames 408A-D of the video stream. In some embodiments, the screen shot of the region can occur on rapid successions, such as performing 80-90 screenshots per second.

In some embodiments, the frame rate analyzer 410 determines that not enough image data can be obtained based on the selected region. This can be due to a region being too small for meaningful analysis, or a region that only displays frames providing static images. For example, the region in frame 408A has selected a region displaying a tree and a bridge, which are static image objects in the video stream that may not be updated as the video stream is being displayed. In such cases, the display region selector 416 may select another region of the frame, such as the region in frame 408B. Continuing from the above example, the display region selector 416 captures a region of frame 408B in which a vehicle is moving across frames of the video screen. By selecting another region, the frame rate analyzer 410 is more likely to determine a more accurate frame rate than the first region selection in frame 408A.

In some embodiments, the size of the region may be too small to provide enough image data to determine adequate frame rate of the video stream. For instance, the region selected in frame 408B may include dimensions that cover only 100 pixel elements, and, as a result, the determined frame rate may be prone to erroneous or stagnant values. In such cases, the display region selector 416 may increase the size of the region that captures portion of the frames displayed on the display component 406. For instance, display region selector 416 may increase the size of the region to one depicted in frame 408C, so as to enable the frame rate analyzer 410 to improve the accuracy of frame rate assessment of the video stream.

As the frame rate determination progresses, the frame rate analyzer 410 may determine that analysis on the region beyond the performance capacity of the device and causes overall performance of the device to degrade. In some embodiments, the frame rate analyzer 410 may determine performance capacity threshold of the device based on the configuration settings determined by a user of the device. In other embodiments, the frame rate analyzer may determine performance capacity of the device by determining whether the frame rate analysis process begins to degrade the performance of the device executing the frame rate analyzer. As illustrated herein above, the size of the region may affect the performance of the device, as processing video frames in a larger region may consume more computing resources as compared to those in a smaller region.

In such scenario, namely if the process of recording the frames is beyond performance capacity of the device, the display region selector 416 may decrease the size of the region. For example, the display region selector 416 may select a region in frame 408D that is smaller than the region selected in frame 408C. By decreasing the size of the region in frame 408D, the device may maintain its performance capacity of the device and avoid the device from crashing, slowing down, or issuing other types of errors. In some embodiments, if the device is performing within its capacity or within the settings as specified in the device performance configurations, frame rate analyzer 410 increases the size of the region to allow frame rates to be determined with higher accuracy.

Figure 5:
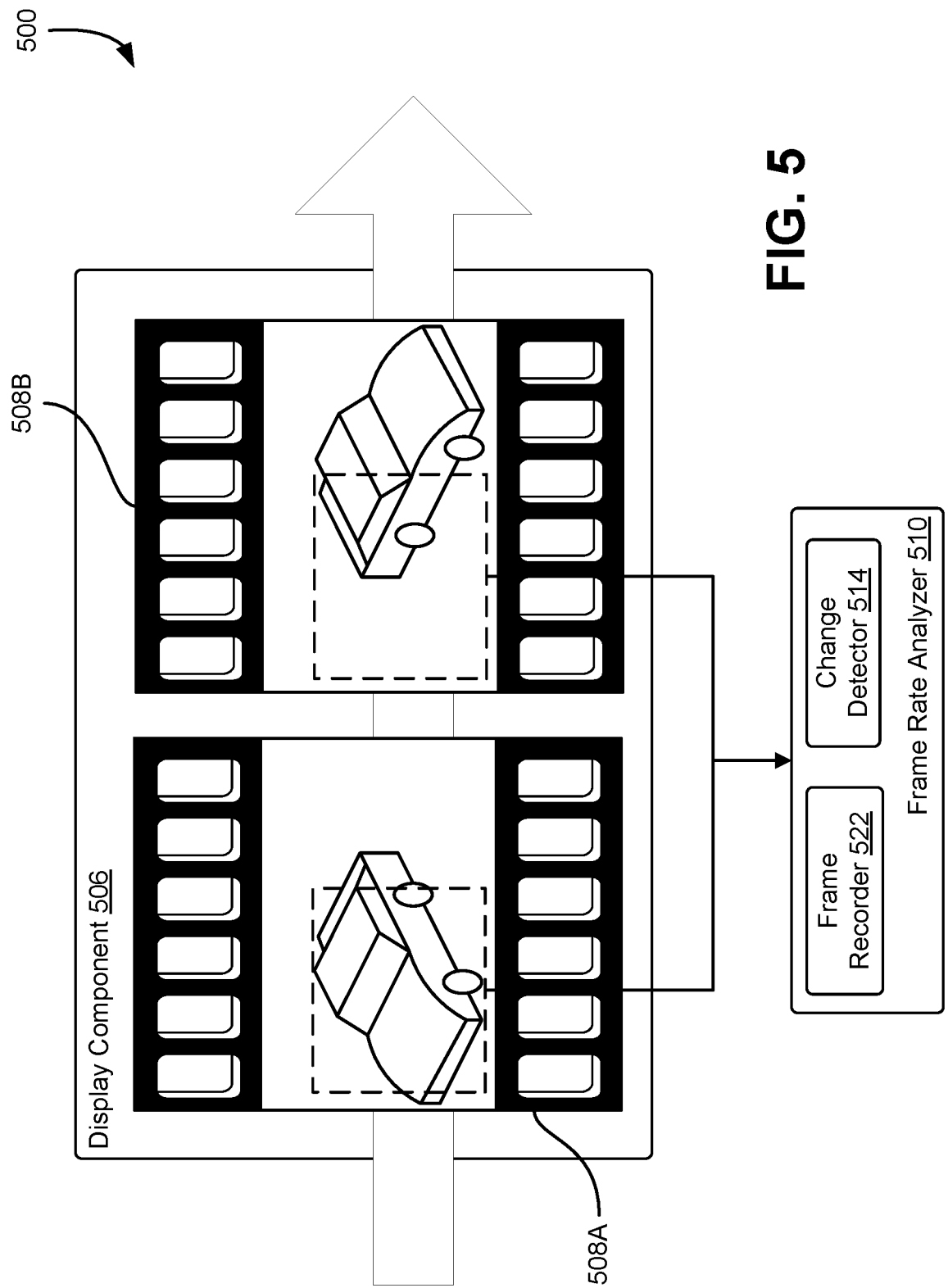
FIG. 5 shows an illustrative example of a video streaming event in which the frame rate is determined based on different images displayed on a region of each frame in accordance with an embodiment.

FIG. 5 shows an illustrative example of a video streaming event 500 in which the frame rate is determined based on different images displayed on a region of each frame in accordance with an embodiment. Frame rate analyzer 510 may be frame rate analyzer 210 of FIG. 2 in accordance with an embodiment. Frame recorder 522 may be frame recorder 222 of FIG. 2 in accordance with an embodiment. Change detector 514 may be change detector 214 of FIG. 2 in accordance with an embodiment. Display component 506 may be display component 206 of FIG. 2 in accordance with an embodiment. One of frames 508A-B may be one of frame 208 of FIG. 2 in accordance with an embodiment.

In several embodiments, the frame recorder 522 records regions in frames 508A and 508B and passes the image data to change detector 514 which may then analyze the changes of color values within the regions. In some embodiments, the frame recorder 522 may associate a time value (e.g., time stamp) with the region so that the frame rate can be determined as a function of time. For example, region in frame 508A may include an image of almost the entire vehicle, but the same region in frame 508A includes an image of a small portion of the vehicle. Based on the changes of images between the regions, the change detector 514 may determine that color composition has changed sufficiently enough that the frame rate can be updated by the frame rate analyzer 510. In several embodiments, frame recorder 522 captures the regions of the frames of the video stream at a predetermined rate (80-90 frames per second) so that frame rate can be more accurately determined.

In another example, consider when the image in the region of frame 508A remains the same as the image of the region in frame 508B. In such event, the change detector 514 may determine that color compositions have not changed, which may indicate that the frame rate remains the same or should be updated as having lower frame rate over a time period associated with the frames. More specifically, because the frame rate is determined as a function of time between the frames the timestamps recorded in each frame can be used to lower the frame rate if the color compositions of the frames 508A and 508B remain the same (e.g., ($\Delta_{color\ composition\ from\ initial\ frame}$)/(time$_{current\ frame}$−time$_{initial\ frame}$), (Incrementing counter value)/(time$_{current\ frame}$−time$_{initial\ frame}$)). In several embodiments, the change detector 514 is configured to provide the color composition of regions in each frame over a predetermined rate as provided by the frame recorder 522.

Figure 6:
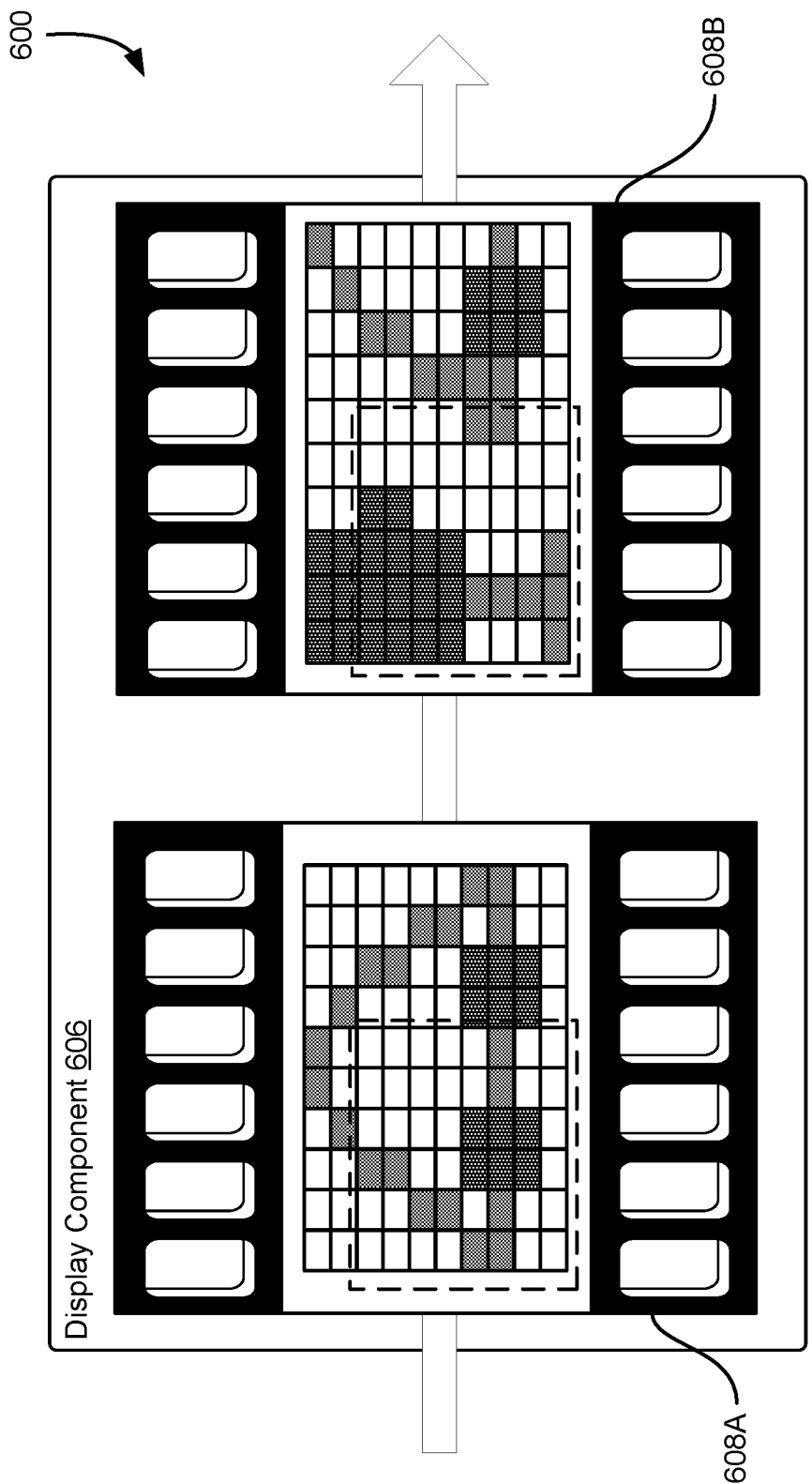
FIG. 6 shows an illustrative example of a video streaming event in which the frame rate is determined based on pixel data presented on a region of each frame in accordance with an embodiment.

FIG. 6 shows an illustrative example of a video streaming event 600 in which the frame rate is determined based on pixel data presented on a region of each frame in accordance with an embodiment. Display component 606 may be display component 206 of FIG. 2 in accordance with an embodiment. One of frames 608A-B may be one of frame 208 of FIG. 2 in accordance with an embodiment. Frame 608A and frame 608B include an array of pixel elements which provide colors that form an image of the frame. As one frame proceeds to the next frame, the pixel elements obtain instructions from the image renderer and display different color in accordance with the instructions. For example, pixel element at location (0,0) of the frame 608A may display a white color, whereas as pixel element at the same location (0,0) of the frame 608B may display a grey color. In several implementations, these changes of color values at the pixel elements associated with frames 608A and 608B are then used to determine the frame rate of the video stream as it is displayed on the display component 606.

In some embodiments, the frame rate analyzer may determine a region in frames 608A and 608B due to various factors, including the restrictions of processor usage associated with the device implementing the frame rate analyzer. If the region is selected, only the pixel elements within the region are analyzed to determine the frame rate of frames 608A and 608B. In one embodiment, the process of capturing color values may initiate by determining the screen size of the frame (e.g., Rectangle screenRect=new Rectangle (Toolkit. getDefaultToolkit( ) .getScreenSize( )). Once the screen size is determined, the frame rate analyzer may configure dimensions of the region based on the size of the frame. For example, width and height variables (e.g., int width=0) may be declared and assigned with number within the dimensions of the screen size, and the variables can be used as input parameters for the region. The values of the width and height variable may be dynamically assigned based on the policies associated with determining a region for frame rate analysis.

The frame rate analyzer may begin recording of regions of each frame in the video screen based on the dimensions of the region (e.g., BufferedImage capture=new Robot( ).createScreenCapture(sizeOfTheRegion)). In some embodiments, a repeating loop can be configured to iterate the recording process of the regions in the frames. After the images of regions are determined, the frame rate analyzer may obtain color values from each pixel element in the region. For example, the x-y dimensions of the region can be set as the width and height variable parameters in which the pixel elements within such parameters are analyzed to obtain the color values (e.g., for (int i=0; i<widthOfRegion; i++) {for (int j=0; j<heightOfRegion; j++) {Pixel.getPixelColor (i, j)}}). In the preceding example, variables i and j may indicate position of the pixel element within the region. In several embodiments, these color values may be compared between frames 608A and 608B. For example, the color values from frame 608B may be subtracted from color values from frame 608A, and such difference can be used to determine whether such value exceeds a threshold value. If so, the frame rate analyzer may conclude that the frames have changed and determines the frame rate based on changes to the frames. In several embodiments, the frame rate analysis may continue over the all frames in the video stream so that frame rate can continue to be updated and displayed on displayed component 606. In other embodiments, the frame rate can be provided back to the content service provider so it may analyze the quality of the video stream being streamed to the end-user devices.

FIGS. 7-10 show illustrative processes executed to generate and manage a service mesh in accordance with the embodiments. The processes are illustrated as a collection of blocks in a logical flow graph, which represents a number of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 7:
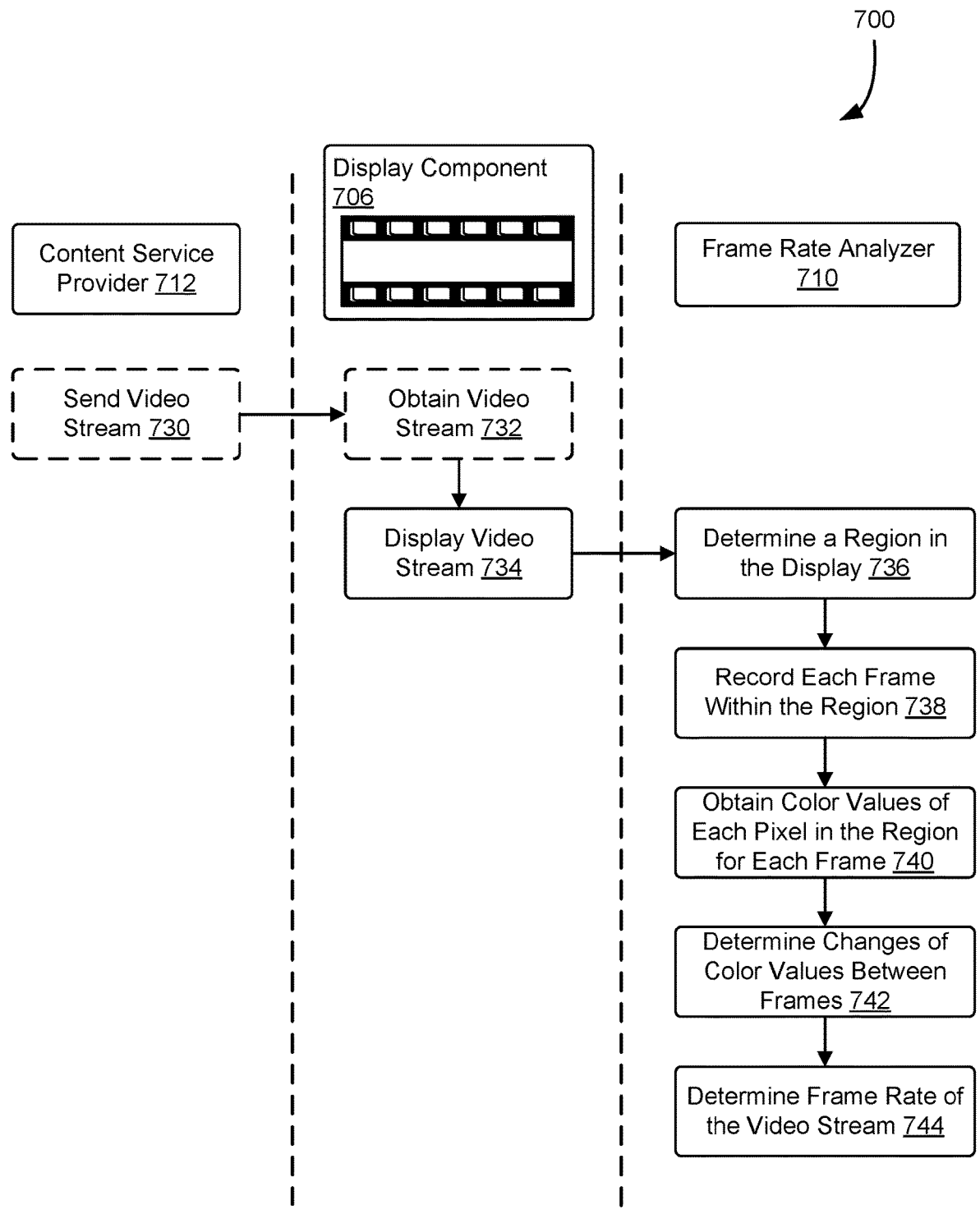
FIG. 7 shows an illustrative example of a process in which frame rate is determined for a video stream displayed on a screen in accordance with an embodiment.

FIG. 7 shows an illustrative example of a process 700 in which frame rate is determined for a video stream displayed on a screen in accordance with an embodiment. Process 700 initiates when the display component 706 initiates the display of video content stream (step 734). In one embodiment, the video content may be stored locally on the client device. In another embodiment, the video content can be optionally transmitted by content service provider 712 (step 730) in which the video stream is obtained by the device associated with the display component (step 732).

As the display component 706 begins displaying the video stream, the frame rate analyzer 710 determines a region in the display for frame rate analysis (step 736). In several embodiments, the size of the region can be determined based on the processing capacity of the device or a number of pixels that can be captured within the region. At step 738, the frame rate analyzer 710 may record each frame within the region as the video stream is displayed. In one embodiment, recording each frame of the video stream may be implemented using a screen capture process of the region of each frame. In some embodiments, the frame rate analyzer 710 may perform a screenshot of the entire frame then select a sub-image of the frame in accordance with the determined region.

At step 740, the frame rate analyzer 710 may obtain color values associated with each pixel in the region for each frame. For example, RGB values of pixel elements spanning across the determined region can be obtained for the frame. In one embodiment, the RGB values of pixels for each frame can be stored in memory (e.g., data store 1110 of FIG. 11) as a data structure such as a map or hash. Once the color values are obtained, the frame rate analyzer 710 determines whether there are changes of color values for each pixel element in the frame region (step 742). In one embodiment, the frame rate analyzer 710 compares the difference of color values between frames with a predetermined threshold value. If the amount of difference exceeds the threshold, the frame rate analyzer 710 increments a counter value. Various other methods of calculating an amount of change may also be used, such as those based on hue, luminance, edge detection, image gradients, and so forth. At step 744, the frame rate analyzer 710 determines the frame rate of the video stream displayed at the display component 706. In several embodiments, the frame rate analyzer 710 determines the frame rate based on the counter value which is determined as a function of the difference of color values exceeding a predetermined threshold value. Process 700 terminates thereafter.

Figure 8:
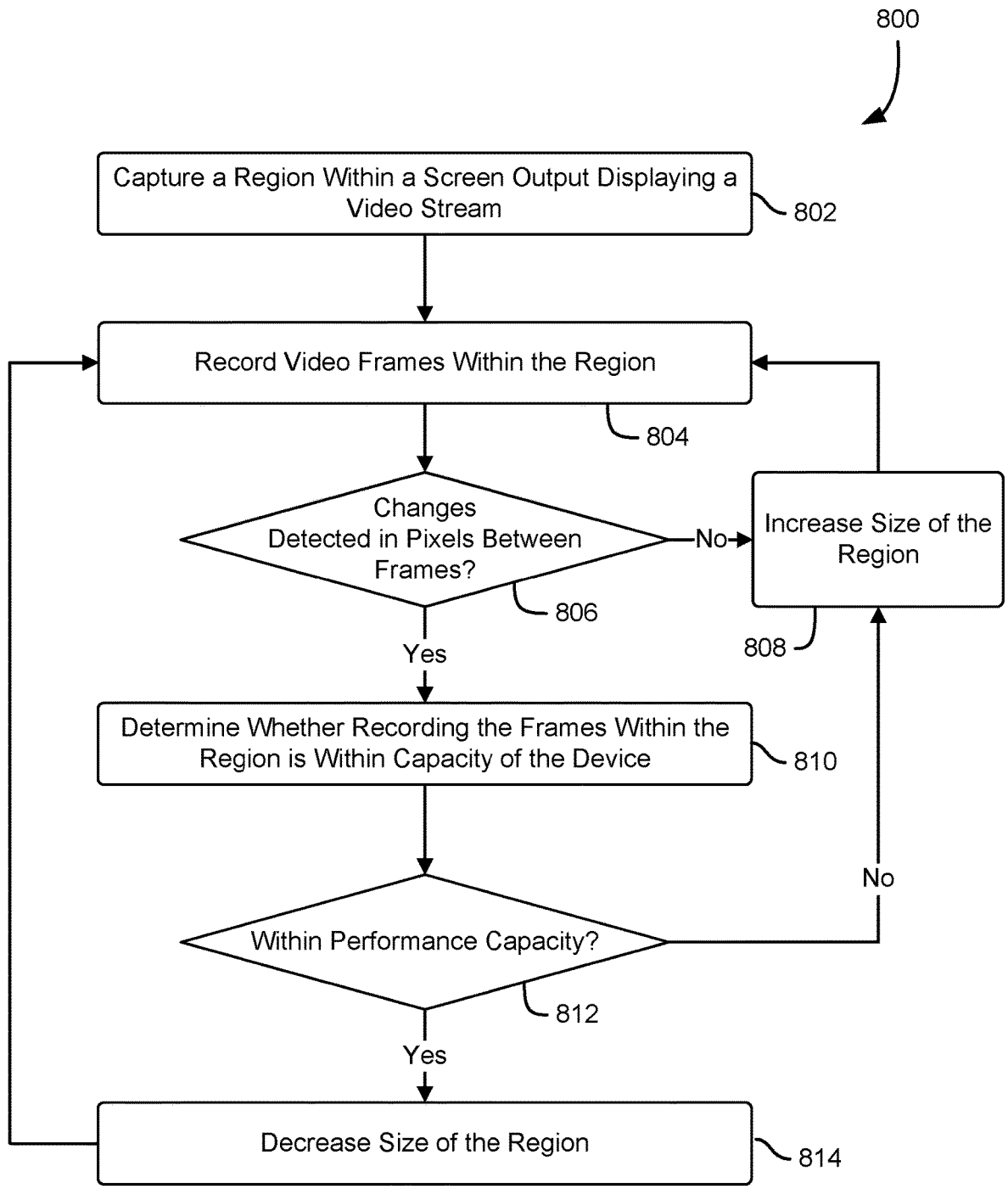
FIG. 8 shows an illustrative example of a process in which a region of a screen is selected for frame rate analysis in accordance with an embodiment.

FIG. 8 shows an illustrative example of a process 800 in which a region of a screen is selected for frame rate analysis in accordance with an embodiment. Process 800 initiates when frame rate analyzer (e.g., frame rate analyzer 410 of FIG. 4) captures a region within a screen output displaying a video stream (step 802). At step 804, the frame rate analyzer may initiate recording video frames displayed within the region. As illustrated herein above, the video frames can be recorded by performing a screen shot of video stream displayed on the region. In some embodiments, the screen shot of the region can occur on rapid successions, such as performing 80-90 screenshots per second.

At step 806, the frame rate analyzer determines if there are any changes in the pixel elements in the captured region for each frame. If no changes are detected between pixel elements in the region ("No" path of step 806), the frame rate analyzer increases the size of the captured region (step 808). By increasing the size of the analyzed region, the frame rate analyzer may improve the accuracy of frame rate assessment of the video stream. In some embodiments, the frame rate analyzer may select another non-overlapping region of the screen to determine whether color values of pixels change in the other region. After the size of the region is increased, the frame rate analyzer records the video frames in the region with a larger size.

If there are changes detected between pixel elements within the region ("Yes" path of step 806), the frame rate analyzer determines the current size of the region is sufficient to estimate the frame rate of the video stream. Since a larger size of the region allows a more accurate frame assessment, the frame rate analyzer determines whether recording the region is within the performance capacity of the device (step 810). In some embodiments, the device executing the frame rate analyzer may be the same device that generates the screen output. In other embodiments, the device executing the frame rate analyzer can be separate from the device generating the screen output.

In several embodiments, the frame rate analyzer may determine performance capacity of the device based on the actual performance of the device as it records the frames within the region. In other embodiments, the frame rate analyzer may determine performance capacity of the device based on the configuration settings determined by a user of the device. In yet other embodiments, the frame rate analyzer may determine performance capacity of the device by determining whether the recording process begins to degrade the performance of the device implementing the frame rate analyzer. As illustrated herein above, the size of the region may affect the performance of the device, as processing video frames in a larger region may consume more computing resources as compared to those in a smaller region.

If the process of recording the frames is within performance capacity of the device ("No" path of step 812), the frame rate analyzer returns to step 808 and increases the size of the region. Once the size of the region is increased, the frame rate analyzer may resume to record video frames of the updated region. As an alternative embodiment, the frame rate analyzer may maintain the size of the region instead of increasing the size, in response to determining that frame rate analysis is within the performance capacity of the device. If the process of recording the frames is beyond performance capacity of the device ("Yes" path of step 812), the frame rate analyzer decreases the size of the region (step 814). By decreasing the size of the region, the device may maintain its performance capacity of the device and avoid the device from crashing, slowing down, or issuing other types of errors. Once the size of the region is decreased, the frame rate analyzer may continue to record video frames with the region with the reduced screen size (step 804). Process 800 continues to iterate steps 804 to 814 for the entire time that the video stream is being displayed or the process 800 is manually terminated.

Figure 9:
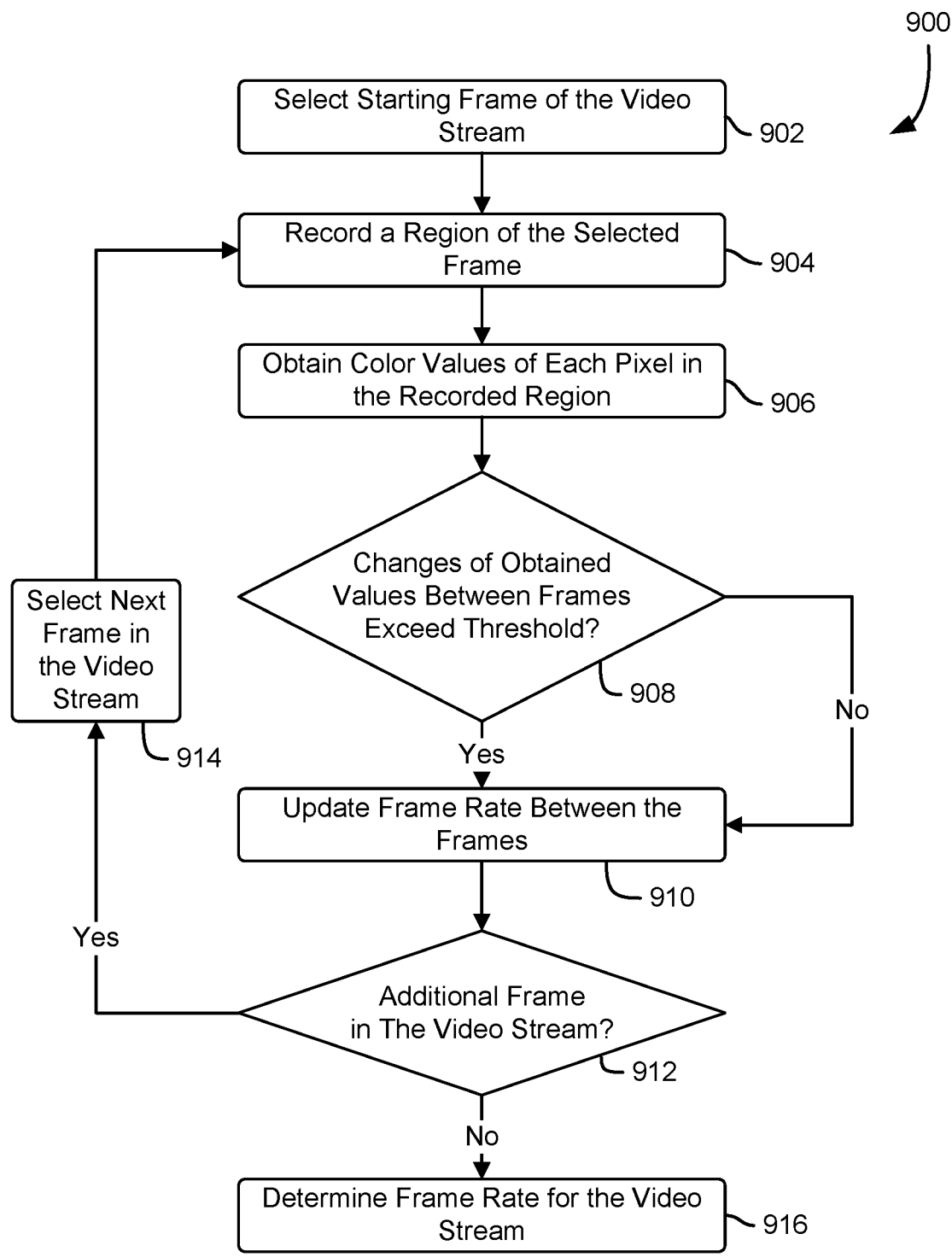
FIG. 9 shows an illustrative example of a process in which frame rate is determined based on changes of color values across pixel elements in frames in accordance with an embodiment.

FIG. 9 shows an illustrative example of a process 900 in which frame rate is determined based on changes of color values across pixel elements in frames in accordance with an embodiment. Process 800 is initiated when frame rate analyzer (e.g., frame rate analyzer 510 of FIG. 5) selects a starting frame of the video stream (step 902). At step 904, the frame rate analyzer records a region of the selected frame. In one embodiment, the size of the region in the frame can be determined based on whether changes of pixel data can be detected between frames. In another embodiment, the size of the region in the frame can be determined based on performance capacity of the device executing the frame rate analyzer.

Once the region is recorded, the frame rate analyzer obtains color values of each pixel element that is associated with the recorded region (step 906). In one embodiment, the frame rate analyzer may determine height and width of the recorded region and record color values (e.g., RGB values) of pixel elements for each coordinate position within the determined height and width of the recorded region. In some embodiments, the color values associated with the region can be stored so as to allow the frame rate analyzer to compare the color values of regions associated with each recorded frame. At step 908, the frame rate analyzer determines whether the changes of color values between frames exceed a predetermined threshold value. In the event that only the color values of the starting frame were obtained and no additional frames were recorded to determine the changes between pixel elements ("No" path of step 908), the frame rate analyzer may skip step 910 and proceed to determining whether there is another frame of the video stream (step 912). In additional embodiments, if the frame rate analyzer determines that there are changes in color values between pixels of the recorded frames but such change in values does not exceed a predetermined threshold value ("No" path of step 908), the frame rate analyzer may proceed to updating the frame rate between the frames (step 910).

If the frame rate analyzer determines that changes in color values between pixels of the recorded frames exceed a predetermined threshold value ("Yes" path of step 908), the frame rate analyzer updates the frame rate between the analyzed frames (step 910). In some embodiments, updating the frame rate may include incrementing a counter value that can be used in a function to determine frame rate of the video stream. The function to determine the frame rate of the video stream may include comparing the value over the time period associated with each recorded frame (e.g., counterValue/$(t_i-t_0)$). After the frame rate is updated, the frame rate analyzer determines whether there are one or more additional frames in the video stream (step 912). If there is another frame in the video stream ("Yes" path of step 912), the frame rate analyzer selects the next frame in the video stream (step 914). In several embodiments, selecting the next frame in the video stream may include taking a screen shot of the next frame in the video stream. After selecting the next frame, the frame rate analyzer iterates through steps 904 to 912 to continue determining frame rates between frames in the video stream. In several embodiments, the frame rates can displayed on the device (e.g., display component 606 of FIG. 6) as they continue to be updated as the video content is streamed on the device. In the event that there are no additional frames in the video stream ("No" path of step 912), the frame rate analyzer determines the frame rate for the entire video stream (step 916). In some embodiments the final counter value can be used to determine the frame rate of the video stream. Process 900 terminates thereafter.

Figure 10:
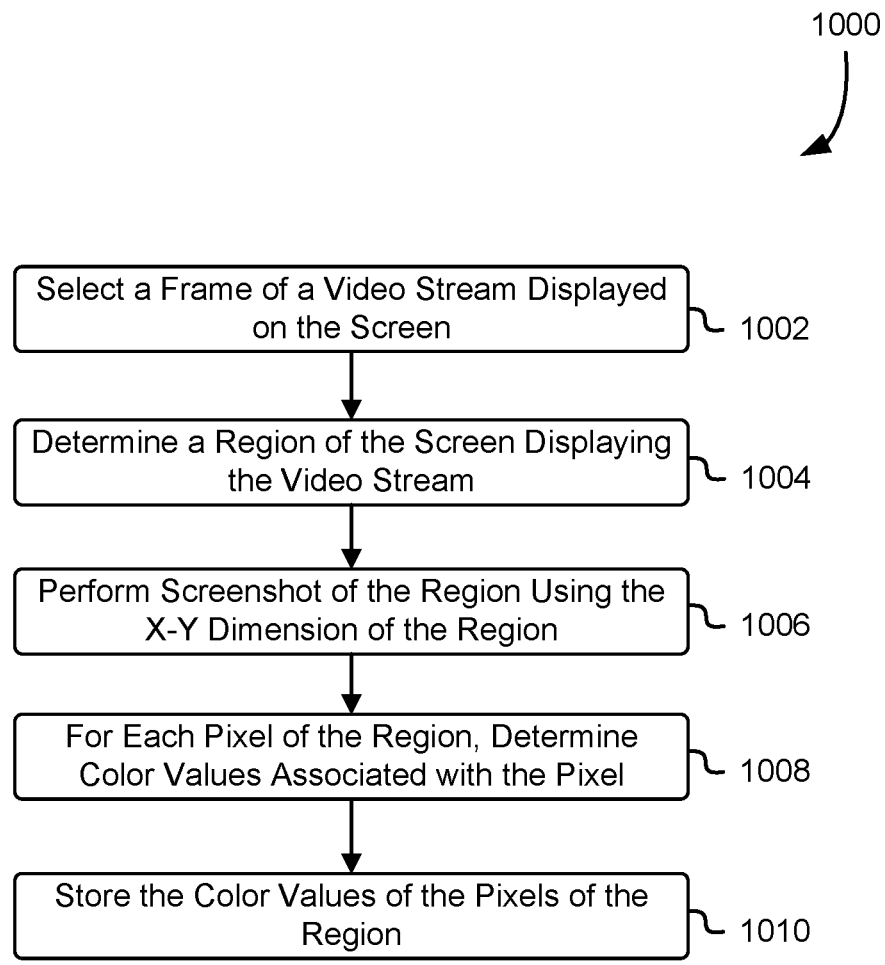
FIG. 10 shows an illustrative example of a process in which color values are determined for pixel elements in the region of each frame in accordance with an embodiment.

FIG. 10 shows an illustrative example of a process in which color values are determined for pixel elements in the region of each frame in accordance with an embodiment. Process 1000 initiates by the frame rate analyzer selects a frame of a video stream displayed on the screen (step 1002). In one embodiment, the selection of the frame includes selecting the first frame after the frame rate analyzer is activated. In another embodiment, the selection of the frame includes selecting the first frame of the video stream, even when the first frame has already been previously displayed to the user. After the starting frame is selected, the frame rate analyzer determines a region of the screen displaying the video screen (step 1004). As illustrated herein above, including process 800 of FIG. 8, the region can be determined based at least in part on the effectiveness of the frame rate analysis and/or the performance capacity of the device. After the region is determined, the frame rate analyzer may use the x-y dimensions of the region to define the parameters that are used as input for performing a screenshot.

The frame rate analyzer then performs a screen capture of the region of the frame (step 1006). In some embodiments, the frame rate analyzer takes a screen capture using features available in native code library associated with the frame analyzer (e.g., BufferedImage capture=new Robot( ).createScreenCapture(DimensionsOfTheRegion)). In other embodiments, the frame rate analyzer may communicate with another standalone software which performs the screen capture and provides the captured image to the frame image analyzer. In other embodiments, the frame rate analyzer may perform a screenshot of the entire screen and crop a sub-image in accordance with the x-y dimensions indicated by the determined region.

After the screenshot is performed, the frame rate analyzer obtains the pixel elements within the region, and obtains color (e.g., RGB) values associated with each pixel element in the region (step 1008). In some embodiments, the x-y dimensions of the region can be set as the width and height variable parameters in which the pixels elements within such parameters are analyzed to obtain the color values. For example, the x-y dimensions of the region is (10,10) of the screen, the frame rate analyzer may obtain the color values by iterating from each row of pixel elements at location (0,0) to location (10,0). In some embodiments, the RGB values may be converted to another value that can be usable for determining the frame rate of the video stream.

Once the color values are obtained, the frame rate analyzer stores the values associated within the region in memory (step 1010). Storing the values may include storing the color values in a buffer which can be discarded once the frame rate has been determined. In other embodiments, the color values can be stored in persistent storage (e.g., data store 1110 of FIG. 11) to allow the frame rate to be verified at a later time. In some embodiments, the stored values associated with a particular frame are discarded after the frame rate has been determined for such frame to conserve computer resources associated frame rate analysis. Process 1000 terminates thereafter.

FIG. 11 illustrates aspects of an example system 1100 for implementing aspects in accordance with an embodiment. As will be appreciated, although a web-based system is used for purposes of explanation, different systems may be used, as appropriate, to implement various embodiments. In an embodiment, the system includes an electronic client device 1102, which includes any appropriate device operable to send and/or receive requests, messages, or information over an appropriate network 1104 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1106 for receiving requests and serving content in response thereto, although for other networks an alternative device serving a similar purpose could be used as would be apparent to one of ordinary skill in the art.

In an embodiment, the illustrative system includes at least one application server 1108 and a data store 1110 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1102 and the application server 1108, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1112 and user information 1116, which are used to serve content for the production side. The data store also is shown to include a mechanism for storing log data 1114, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1110.

The data store 1110, in an embodiment, is operable, through logic associated therewith, to receive instructions from the application server 1108 and obtain, update or otherwise process data in response thereto and the application server 1108 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1102. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1100 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1100, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   recording, for a selected region of a screen of a computing display device displaying a video stream comprising a plurality of image frames, one or more image frames of the plurality of image frames displayed at the selected region, the one or more image frames comprising a first image frame and a second image frame subsequently displayed after the first image frame, wherein size of the selected region of the screen to be recorded is increased or decreased based at least in part on the computing display device being within a performance capacity;
   detecting a change between the first image frame and the second image frame; and
   determining, based at least in part on the change, a frame rate of the video stream.

2. The computer-implemented method of claim 1, further comprising:
   determining a number of pixels changed between the first image frame and the second image frame;
   in response to determining that the number of pixels changed exceeds a predetermined threshold value, updating a counter value; and
   determining the frame rate of the video stream based on the counter value.

3. The computer-implemented method of claim 1, further comprising:
   determining that the computing display device is within the performance capacity; and
   in response to determining that the computing display device is beyond the performance capacity, decreasing the size of the selected region.

4. The computer-implemented method of claim 1, wherein the plurality of image frames of the video stream is provided by a content service provider as a client device is displaying the video stream.

5. A non-transitory computer-readable storage medium comprising executable instructions that, as a result of being executed by one or more processors of a computer system, cause the computer system to:
   identify a region of a screen, the screen displaying a plurality of images;
   record a set of images that are displayed on the region, wherein sizes of the set of images that are recorded are adjusted based on whether the computer system is within a performance capacity;
   determine information indicative of an amount of change between individual images of the set of images; and
   calculate, based at least in part on the information, a frame rate for the plurality of images.

6. The non-transitory computer-readable storage medium of claim 5, wherein the executable instructions further comprise instructions that, as a result of being executed by the one or more processors, cause the computer system to:
   determine whether a number of pixels changed between a first individual image and a second individual image exceeds a predetermined threshold value, wherein the set of images includes the first individual image and the second individual image; and
   in response to the number of pixels changed exceeding the predetermined threshold value, update the information.

7. The non-transitory computer-readable storage medium of claim 6, wherein the number of pixels changed indicated in the information falls below a minimum threshold value.

8. The non-transitory computer-readable storage medium of claim 7, wherein the executable instructions further comprise instructions that, as a result of being executed by the one or more processors, cause the computer system to identify another region of the screen in response to determining that the number of pixels changed falls below the minimum threshold value, the other region associated with a screen size that is larger than screen size of the region.

9. The non-transitory computer-readable storage medium of claim 5, wherein the executable instructions to identify the region of the screen further comprise instructions that, as a result of being executed by the one or more processors, cause the computer system to determine location coordinates of the region of the screen.

10. The non-transitory computer-readable storage medium of claim 5, wherein the executable instructions to identify the region of the screen further comprise instructions that, as a result of being executed by the one or more processors, cause the computer system to:
    identify a number of image objects displayed on the screen; and
    in response to a first image object of the image objects moving at a higher rate than a second image object of the image objects, determine the region of the screen that includes the first image object.

11. The non-transitory computer-readable storage medium of claim 5, wherein the plurality of images are transmitted over a communication network by another computer system.

12. The non-transitory computer-readable storage medium of claim 5, wherein the region encompasses the screen.

13. A system, comprising:

one or more processors;

memory that stores computer-executable instructions that are executable by the one or more processors to cause the system to:

identify a region of a screen, the screen displaying a plurality of images;

record a set of images that are displayed on the region, wherein a size of an image of the set of images that are recorded is adjusted based on whether the system is within a performance capacity;

determine information indicative of an amount of change between individual images of the set of images; and calculate, based at least in part on the information, a frame rate for the plurality of images.

14. The system of claim 13, wherein:

the computer-executable instructions include instructions that are executable by the one or more processors to cause the system to select a change detection mechanism based at least in part on the performance capacity of the system; and the information indicative of the amount of change between the individual images of the set of images is determined based at least in part on the change detection mechanism that was selected.

15. The system of claim 13, wherein:

the information indicative of the amount of change indicates that there was no change between the individual images of the set of images; and the computer-executable instructions include further instructions that are executable by the one or more processors to increase size of a subsequent region to be recorded.

16. The system of claim 13, wherein:

the information indicative of the amount of change indicates that there was a change between the individual images of the set of images; and the computer-executable instructions include further instructions that are executable by the one or more processors to:

determine whether recording the set of images within the region was within capacity of the system; and as a result of determining the system was not within capacity, increasing size of a subsequent region to be recorded.

17. The system of claim 13, wherein the computer-executable instructions include instructions that are executable by the one or more processors to cause the system to decrease size of the region in response to determining the system is within the performance capacity.

18. The system of claim 13, wherein the computer-executable instructions include further instructions that are executable by the one or more processors to further cause the system to select a different region of the screen based at least in part on the information indicating no change between the individual images of the set of images.

19. The system of claim 13, wherein the computer-executable instructions include instructions that are executable by the one or more processors to cause the system to:

determine a first size of the region;

increase the first size of the region until computing performance of the system begins to degrade, thereby determining a second size of the region that is larger than the first size; and record the set of images from the second size of the region.

20. The system of claim 13, wherein the computer-executable instructions to determine the information indicative of the amount of change between the individual images of the set of images are performed based at least in part on pixel composition of the individual images.

\* \* \* \* \*